UNITED STATES PATENT OFFICE.

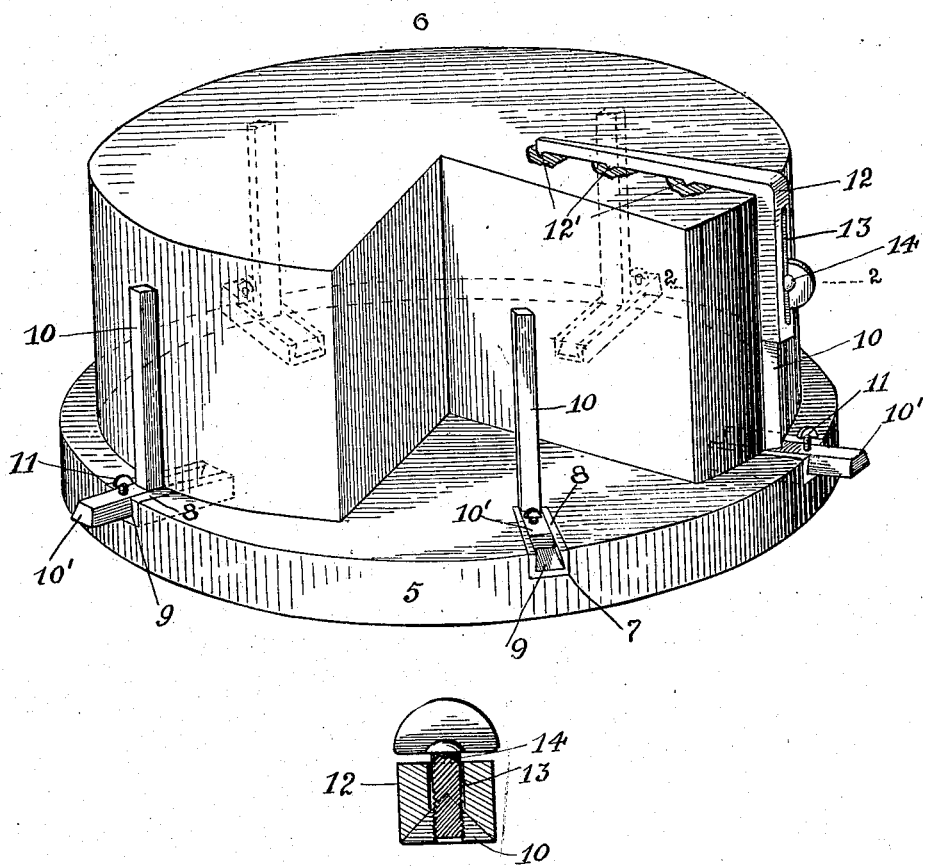

CHARLES P. MEE, OF LOS ANGELES, CALIFORNIA.

CHEESE-HOLDING BOARD.

No. 911,145.

Specification of Letters Patent.

Patented Feb. 2, 1909.

Application filed August 10, 1907. Serial No. 387,982.

*To all whom it may concern:*

Be it known that I, CHARLES P. MEE, a citizen of the United States, residing at Los Angeles, county of Los Angeles, and State of California, have invented new and useful Improvements in Cheese-Holding Boards, of which the following is a specification.

My invention relates to a board for holding cheese while the same is being cut for sale, and the object thereof is to provide a board on which the cheese will be firmly held and which will hold the last part cut in an upright position and in which the holders can be adjusted so as to permit cheeses of different sizes being used on the same board.

A further object is to do away with the usual holding prongs which enter the bottom of the cheese to hold it from slipping on the board, which often causes the cheese to mold around the same, thereby causing waste.

I accomplish these objects by the board described herein and illustrated in the accompanying drawings in which;

Figure 1 is a perspective view of a cheese with a piece cut out, resting upon a cheese board equipped with my improvements. Fig. 2 is a section on the line 2—2 of Fig. 1 of the top holding bar, and the side holding bar to which it is attached.

In the drawings 5 is a cheese board preferably wooden and circular, and preferably a little larger than the cheese 6 which is placed thereon. At suitable distances around the periphery of the board and opening flush with the top of the board are grooves 7, which, when the wood is soft are lined with a metal lining 8 containing therein a dove-tail groove 9 which opens flush with the top of the board. If the board is made of hard wood the dove-tail groove can be constructed therein and the metal lining omitted, but where soft woods are used for the board I prefer the metal lining. These grooves extend radially toward the center of the board a sufficient distance to permit of the adjustment of the side holding-posts 10 to fit any sized cheese that may be used on the board. These side holding-posts are provided with dove-tail shanks 10' which fit into the dove-tail grooves in the board. These shanks are provided with set screws 11 by means of which the shanks are locked in the groove after the post is set up in contact with the cheese. These holding posts may be square or may be triangular in shape, both forms being shown in Fig. 1. On one of these holding-posts is mounted the L-shaped top bar 12, having a slot 13 in the vertical portion thereof. A set screw 14 passes through this slot and into the holding bar in threaded engagement with the holding bar so that the top bar may be locked to the holding bar. The sides of the vertical portions of this bar surround the sides of the holding bar, and the horizontal portion of the holding bar is preferably provided with points 12' which indent the top of the cheese to give the bar a better hold thereon.

In the operation of my device two or more of the holding bars would be removed from the board and the cheese would be placed on the board in a central position. The holding bars would then be adjusted in their grooves to engage the side of the cheese. The top holding bar would then be adjusted so that the points of the top portion thereof would indent the top of the cheese. The operator would then commence cutting the cheese as close to the top holding bar as is practical and would continue to cut slices therefrom in the usual manner, first working away from the top holding bar until half the cheese was cut and then working toward it until all the cheese was cut.

By this construction it will be seen that the cheese is always firmly supported on the board and held in its original upright position until the very last slice is cut, as the top holding bar retains the last portion of the cheese in a vertical position until released therefrom. Other means to adjust the side bars may be used in place of the grooves.

Having described my invention what I claim is:

A cheese board having a plurality of grooves in its upper surface; holding posts having shanks at the lower end thereof, said shank being at right angles to the body of the post and fitting into said grooves; and an L-shaped top bar secured to one end of said holding posts and vertically adjustable thereon.

In witness that I claim the foregoing I have hereunto subscribed my name this 1st day of August, 1907.

CHARLES P. MEE.

Witnesses:
G. E. HARPHAM.
S. B. AUSTIN.